United States Patent

[11] 3,634,036

[72] Inventor Gerald J. Fleming
  Bowie, Md.
[21] Appl. No. 805,836
[22] Filed Mar. 10, 1969
[45] Patented Jan. 11, 1972
[73] Assignee The United States of America as represented by the Secretary of the Navy

[54] NITRO-SUBSTITUTED EPOXY POLYMERS AND THE PYROLYZED PRODUCTS THEREOF
10 Claims, No Drawings

[52] U.S. Cl.................................................. 23/209.2,
  23/209.1, 23/209.4, 106/56, 260/47 EA, 260/47 EN
[51] Int. Cl.................................................. C08g 30/14,
  C08g 30/12, C04b 35/52
[50] Field of Search.......................................... 260/2 EP,
  47 EP, 2 EC, 47 EA, 2 EA, 47 EC; 23/209.1,
  209.2, 209.4; 106/56, 55

[56] References Cited
OTHER REFERENCES

Lee and Neville, Handbook of Epoxy Resins p. 7–2, McGraw-Hill 1967, TP1180E6L4

Primary Examiner—William H. Short
Assistant Examiner—E. Nielsen
Attorneys—R. S. Sciascia and J. A. Cooke ABSTRACT: Nitrosubstituted epoxy polymers which are the reaction products of (1) a nonnitrosubstituted epoxy resin cured with a nitrosubstituted curing agent or (2) a nitrosubstituted epoxy resin cured with a conventional nonnitrosubstituted curing agent for that purpose or (3) a nitrosubstituted epoxy resin cured with a nitrosubstituted curing agent and the pyrolyzed products of these systems.

NITRO-SUBSTITUTED EPOXY POLYMERS AND THE PYROLYZED PRODUCTS THEREOF

BACKGROUND OF THE INVENTION

This invention generally relates to cured nitro-substituted epoxy polymers and to the pyrolyzed products thereof. More particularly, the cured nitro-substituted epoxy polymers of the present invention are particularly useful as ablative polymers, for example, as heat shield materials and rocket motor insulators. The pyrolyzed products of the present invention, while useful for ablative applications, also find utility in electrical and structural heat-insulating applications, such as material for electrical motor components, crucibles, etc.

It has been established that in order for a material to function as a high performance ablative heat shield it must be one that consumes great amounts of heat per unit mass and does so while transmitting very little of this heat backward to some unprotected surface. This thermal control process is viewed as a function of the overall heat capacity of a material which is composed of the following factors: (1) the heat capacity of the virgin material and its degradative products (preferably degradation should be controllable and predetermined), (2) endothermic chemical reactions, (3) thermodynamic phase changes, and (4) heat blockage and reradiation at the boundary layer by degradative gases and carbonaceous char. Among these factors the ability to form substantial amounts of strong carbonaceous char is most essential for a number of reasons: (1) aerodynamic considerations often require that dimensional configuration of the heat shield be maintained, (2) char surfaces provide catalystic sites for further endothermic cracking of pyrolysis gases in the interior as they percolate outward, and (3) the char itself is a good insulator by virtue of its porosity and heat capacity.

Many of the currently known epoxy resin systems which are useful as heat shield materials do not produce sufficient amounts of carbonaceous char under ablative conditions to achieve the high performance which is desirable of them. Moreover, many of the prior art epoxy resin ablative materials do not degrade in the required controlled and predetermined manners needed for effective heat shields.

The pyrolyzed materials of the present invention are unique over any of the known vitreous-carbon-type materials in that they are produced from addition polymerization reactions as opposed to the condensation reactions required to produce prior art phenol-formaldehyde vitreous carbons. The products of the present invention, therefore, are not susceptible to any original detrimental weight loss due to the loss of water which occurs in condensation reactions of the prior art. Moreover, the pyrolyzed products of this invention contain a lesser percentage of carbon than the hereinbefore-mentioned prior art vitreous carbons and an unusually high percentage of nitrogen, which factors are believed to be directly related to the unusual thermal stability and high hardness of the present materials.

SUMMARY OF THE INVENTION

It is an object of this invention to provide novel cured nitro-substituted epoxy polymers which are capable of yielding unusually high amounts of strong carbonaceous char under ablative conditions and which degrade in a controlled manner.

Another object of this invention is to provide novel pyrolyzed materials which are the pyrolysis products of these hereinbefore-mentioned nitro-substituted epoxy resins, and while useful for ablative applications, further demonstrate unusually high-thermal stability and hardness.

DESCRIPTION OF THE PREFERRED EMBODIMENTS

Basically the cured nitro-substituted epoxy polymers of the present invention are the reaction products of (1) a nitro-substituted epoxy resin and a conventional epoxy resin nonnitro-substituted curing agent or (2) a nonnitro-substituted epoxy resin and a nitro-substituted curing agent or (3) a nitro-substituted epoxy resin and a nitro-substituted curing agent.

The nonnitro-substituted epoxy resins employed in this invention may be any of the known or commercially available glycidyl ether type epoxy resins. For the purposes of this invention nonnitro-substituted epoxy resins having an epoxy equivalent weight of at least 100 to 600 are suitable, the preferred range being 110 to 350. Typically among those nonnitro-substituted epoxy resins which are commercially available and suitable for this invention are the glycidyl ethers of polyhydric phenols such as bisphenol-A-epichlorohydrin condensate (Epon 826), resorcinol diglycidyl ether (ERE-1359), polyglycidyl ether of phenol-formaladehyde novalac (DEN 438), triglycidyl ether of trihydroxy biphenyl (Kupox 171) and tetraglycidyl ether of tetraphenylene ethane (Epon 1031).

Among the nitro-substituted epoxy resins which are employed in the practice of this invention are those resins disclosed in copending application, Ser. No. 759,745, filed Jan. 31, 1969. These resins are within the scope of Formula I given below:

Formula I

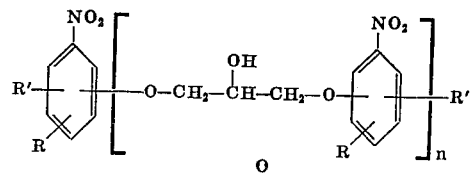

wherein R can be H, $-O-CH_2-CH \overset{O}{\diagup\!\!\diagdown} CH_2$, and OH, and $n$ can vary from 0–10.

Preparation of the compounds falling within the scope of Formula I is conveniently accomplished by reacting by conventional means, such as base condensation, an epihalohydrin with a compound falling within the scope of Formula II below:

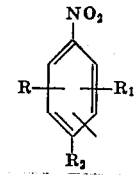

wherein R is OH, and $R_1$ and $R_2$ is H or OH. Specific compounds falling within the scope of Formula II are for example, o-nitrophenol, m-nitrophenol, p-nitrophenol, 2-nitro-4-hydroxy-phenol, 2-nitroresorcinol, 5-nitroresorcinol, 4-nitroresorcinol, 3-nitropyrocatechol, 4-nitropyrocathecol, 5-nitropyrogallol and the like. In this reaction each phenolic hydroxyl group is replaced, theoretically, by a glycidyl radical.

When a nitro-substituted epoxy resin, as set forth by Formula I is employed, the curing agent may be any of the conventional nonnitro-substituted curing agents used for epoxy resins, such as polyamines, polycarboxylic acids and the anhydrides thereof or any of the ionic initiators of the Lewis acid type. Specifically, some of the more preferred curing agents are, e.g., triethylene tetramine, m-phenylene diamine, p,p'-diamino-diphenyl sulfone, p,p'-methylene dianiline, tetrahydrophthalic anhydride, trimellitic anhydride, boron trifluoride monoethylamine, 3,3', 4,4'-benzophenone tetracarboxylic dianhydride, methyl norbornene-2,3-dicarboxylic anhydride and the like.

The nitro-substituted curing agents which are employed in the present invention in the case of the nonnitro containing epoxy resins or nitro containing epoxy resins hereinbefore mentioned, may be any of the known or commercially available nitro derivatives of the hereinbefore-mentioned curing agents for epoxy resins. Among those nitro-substituted compounds which may be employed here are, e.g., 2-nitroresorcinol, 2-nitro-p-phenylene diamine, 4-nitro-o-phenylene diamine, m-nitro-phenyl boric acid, 2-nitro-1,8-naphthalic anhydride and 5-nitrobenzimidazole.

The nonnitro-substituted epoxy resins and nitro-substituted epoxy resins of the present invention are cured with the hereinbefore identified materials at temperatures up to about 175° C. employing any of the conventional techniques and catalysts for curing epoxy resins. The ratios of resin material and curing agent are not extremely critical to the overall characteristics of the final product. For the most part, conventional stoichiometric amounts of materials are employed for optimum results.

When the cured nitro-substituted epoxy resins of the present invention are subjected to pyrolysis conditions, such as temperatures up to about 3,000° C., materials are produced, which although slightly similar in appearance to carbon and graphite, possess uniquely different mechanical properties. Preferably, the procedure for making these pyrolyzed products involves heating the cured resins of the present invention to about 800° C. in an inert or nonoxidizing environment. The rate of heating the resin is dependent upon the thickness and mass of the resin material used, e.g., a material of large thickness and mass requires low-heating rates, e.g., 25° per hour with dwell times of about 3 hours at, e.g., about every 100°. This low-rate procedure is followed to prevent blowing of the material by the rapid evolution of gases. On the other hand, thin films of the resin material may be heated to about 800° C. at rates of about 2 to 5° per minute while still retaining structural integrity. The overall properties of the pyrolyzed products vary depending upon the number of nitro-substituents, the aromaticity and the functionality of the resin material employed in the pyrolysis.

The general nature of the invention having been set forth, the following examples are presented as specific illustrations thereof. It will be understood that the invention is not limited to these examples but is susceptible to various modifications that will be recognized by one of ordinary skill in the art.

EXAMPLE 1

Ten grams of resorcinol diglycidyl ether (epoxide equivalent 130) was cured by admixing with 8.3 grams of 2-nitroresorcinol and 0.18 grams of N,N-benzyldimethylamine. This mixture was stirred for one-half hour at 90° C. and cured for 16 hours at 100° C. and 5 hours at 160° C.

EXAMPLE 2

20.6 grams of resorcinol diglycidyl ether (epoxide equivalent 130) was cured by admixing with 10.0 grams of m-nitrophenylboric acid. These components were stirred for 10 minutes at 90° C. and cured for 2 hours at 100° C. and 15 hours at 160° C.

EXAMPLE 3

Five grams of resorcinol diglycidyl ether (epoxide equivalent 130 ) was admixed with 1.7 grams 2-nitro-p-phenylene diamine. The two were stirred at 100° C. for one-half hour and then cured for 4 hours at 100° C. and 16 hours at 150° C.

EXAMPLE 4

Five grams of the polyglycidyl ether of phenol-formaldehyde novalac (DEN 438) was admixed with 1.1 grams of 4-nitro-o-phenylene diamine and stirred for 1 hour at 95° C. The mixture was cured for 4 hours at 115° C. and then 16 hours at 160° C.

EXAMPLE 5

Two hundred grams of the triglycidyl ether of trihydroxy biphenyl (epoxide equivalent 145) were admixed with 103.2 grams of 2-nitroresorcinol and 2.5 grams of N,N-benzyl-dimethylamine catalyst and stirred at 85° C. for one-half hour. The mixture was then cast as ⅛-inch panels according to the following schedule: 4 hours at 100° C., 16 hours at 150° C. and 2 hours at 175° C. The material was cut into specimens measuring 1.25 inches wide by 2.40 inches long by 0.13 inch thick. This specimen, when heated slowly at a rate of about 10° C. per hour over 20 hours (from 200 to 400° C.) retained 71.5 percent of its original weight and 90.0 percent of its original dimensions. After further pyrolysis to 800° C. over a 24 hour period at 2°–5° per minute, the specimen retained 56 percent of its weight and 80 percent of its original dimensions. The material has a specific gravity of 1.475, a flexural strength of 11,500 p.s.i. and a flexural modulus of $2.5 \times 10^6$ p.s.i. A carbon, hydrogen, nitrogen analysis yields 87.24 percent carbon, 1.92 percent hydrogen and 3.03 percent nitrogen. The pyrolyzed material is extremely hard as observed by its capability to scratch glass and stainless steel. After 6 hours in air at 400° C., it does not lose weight.

A thermal gravimetric analysis of the material obtained in example 1 showed a char residue of 35 percent at 700° C. with a maximum rate of weight loss of 4 percent per minute. Whereas, thermal gravimetric analysis of the product of resorcinol diglycidyl ether cured according to the procedure of example 1 with resorcinol showed a 5 percent char residue at 700° C. with a maximum rate of weight loss of 17 percent per minute. The product of example 3 upon thermal gravimetric analysis demonstrated a 49 percent char residue at 700° C., while resorcinol diglycidyl ether cured with p-phenylene diamine merely showed a 29 percent residue upon thermal gravimetric analysis.

Thermal gravimetric comparisons have also been made between resorcinol diglycidyl ether cured with benzimidazole and resorcinol diglycidyl ether cured with 5-nitrobenzimidazole. In the former case, a char residue of 14 percent with a maximum rate of weight loss of 8 percent per minute was realized. In the case of the nitro-substituted benzimidazole, a char residue of 46 percent was realized with a maximum rate of weight loss of 2 percent per minute.

Obviously, numerous modifications and variations of the present invention are possible in the light of the above teachings. It is therefore to be understood that within the scope of the appended claims the invention may be practiced otherwise than as specifically described herein.

What is claimed and desired to be secured by Letters Patent of the United States is:

1. The reaction product of a nonnitro-substituted glycidyl ether of a polyhydric phenol cured with a nitro-substituted curing agent selected from the group consisting of 2-nitroresorcinol, 2-nitro-o-phenylene diamine, 4-nitro-m-ylene diamine, m-nitrophenyl boric acid, 2-nitro-1,8-naphthalic anhydride and 5-nitro-benzimidazole.

2. The product as defined in claim 1 wherein said glycidyl ether of a polyhydric phenol has an epoxy equivalent weight of at least 100.

3. The product as defined in claim 2 wherein the glycidyl ether of a polyhydric phenol and nitro-substituted curing agent are present in essentially stoichiometric amounts.

4. The reaction product of a nitro-substituted epoxy resin defined by the general formula:

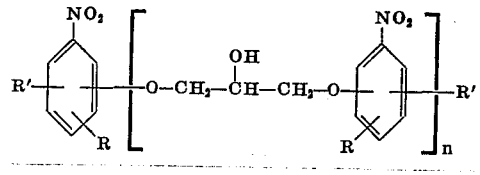

wherein R is a member selected from the group consisting of H, OH and

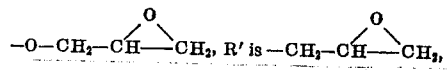

and n has a valve of 0 to 10 inclusive and a nitro-substituted curing agent selected from the group consisting of 2-nitroresorcinol, 2-nitro-p-phenylene diamine, 4-nitro-o-phenylene diamine, m-nitrophenyl boric acid, 2-nitro-1,8-naphthalic anhydride and 5-nitro-benzimidazole.

5. The product of claim 4 wherein the nitro-substituted epoxy resin and the nitro-substituted curing agent are present in essentially stoichiometric amounts.

6. The hard graphitelike material obtained by the pyrolysis of the reaction product of a nonnitro-substituted glycidyl ether of a polyhydric phenol cured with a nitro-substituted curing agent selected from the group consisting of 2-nitroresorcinol and 5-nitrobenzimidazole at a temperature of up to about 800° C.

7. The hard graphitelike material obtained by the pyrolysis of the product defined by claim 4 at a temperature of up to about 800° C.

8. The hard graphitelike material obtained by the pyrolysis of the reaction product of a nitro-substituted epoxy resin defined by the general formula:

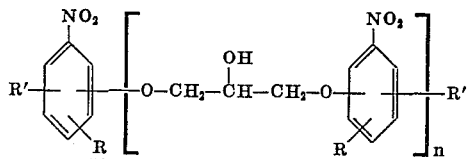

wherein R is a member selected from the group consisting of H, and

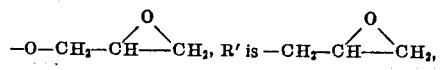

and $n$ has a value of 0 to 10 inclusive with a nonnitro-substituted curing agent selected from the group consisting of triethylene tetramine, m-phenylene diamine, p,p'-diaminodiphenyl sulfone, p,p'-methylene dianiline, tetrahydrophthalic anhydride, trimellitic anhydride, boron trifluoride monoethylamine, 3,3',4,4'-benzophenone tetracarboxylic dianhydride, and methyl norbornene-2,3-dicarboxylic anhydride at a temperature of up to about 800° C.

9. The product as defined in claim 1 wherein said glycidyl ether of a polyhydric phenol is selected from the group consisting of a bisphenol-A-epichlorohydrin condensate, resorcinol diglycidyl ether, a polyglycidyl ether of phenol-formaldehyde novalac, a triglycidyl ether of trihydroxy biphenyl and a tetraglycidyl ether of tetraphenylene ethane.

10. The hard graphitelike material defined in claim 6 wherein said nonnitro-substituted glycidyl ether of a polyhydric phenol is the triglycidyl ether of trihydroxy biphenyl and said nitro-substituted curing agent is 2-nitroresorcinol.

* * * * *